United States Patent
Morrison et al.

(10) Patent No.: US 7,640,868 B2
(45) Date of Patent: Jan. 5, 2010

(54) STEREO SPEAKER STAND

(75) Inventors: David Morrison, Markham (CA);
Robert G. Dickie, King (CA)

(73) Assignee: D Morrison Consulting Inc., Markham, Ontario (CA)

( * ) Notice: Subject to any disclaimer, the term of this patent is extended or adjusted under 35 U.S.C. 154(b) by 133 days.

(21) Appl. No.: 11/811,091

(22) Filed: Jun. 8, 2007

(65) Prior Publication Data
US 2008/0302945 A1  Dec. 11, 2008

(51) Int. Cl.
*A47B 7/00* (2006.01)

(52) U.S. Cl. .............. 108/91; 108/92; 108/93; 211/151; 211/188; 248/560; 248/562; 248/636; 248/638

(58) Field of Classification Search ........ 248/580, 248/581, 584, 599, 605, 608, 609, 615, 618, 248/621, 634, 635, 638, 676; 211/134, 188, 211/194, 182; 108/91–93, 156, 157.13, 157.15, 108/159, 158.11, 180, 186, 147.12, 147.13; 181/150
See application file for complete search history.

(56) References Cited

U.S. PATENT DOCUMENTS

| | | | |
|---|---|---|---|
| 1,273,939 A | | 7/1918 | Sidel |
| 2,933,850 A | | 4/1960 | Martin |
| 2,956,368 A | | 10/1960 | Klein |
| 4,011,821 A | * | 3/1977 | Neal ............. 108/156 |
| 4,493,471 A | | 1/1985 | McInnis |
| 4,687,173 A | | 8/1987 | Genna |
| 4,948,076 A | | 8/1990 | Sumrell et al. |
| 5,169,104 A | | 12/1992 | Kwoh |
| 5,570,867 A | * | 11/1996 | Norkus ............. 248/635 |
| 5,881,653 A | * | 3/1999 | Pfister ............. 108/147.13 |
| 5,915,662 A | * | 6/1999 | Itakura et al. ............. 248/561 |
| 6,024,338 A | * | 2/2000 | Koike et al. ............. 248/638 |
| 6,155,530 A | * | 12/2000 | Borgen ............. 248/638 |
| 6,247,414 B1 | * | 6/2001 | Sikora et al. ............. 108/190 |
| 6,296,238 B1 | | 10/2001 | Lund-Andersen |
| 6,357,717 B1 | * | 3/2002 | Kennard, IV ............. 248/638 |
| 6,895,870 B1 | * | 5/2005 | Bizlewicz ............. 108/91 |
| 6,976,434 B2 | * | 12/2005 | Roig et al. ............. 108/25 |
| 2006/0006307 A1 | | 1/2006 | Mogilever |

* cited by examiner

*Primary Examiner*—J. Allen Shriver, II
*Assistant Examiner*—Alaeddin Mohseni
(74) *Attorney, Agent, or Firm*—Sand & Sebolt

(57) ABSTRACT

A stand for a stereo speaker. The stand comprises a support and a plurality of isolating and polarizing assemblies that engage the support and allow movement of the speaker relative to the support in one direction more than in another direction and to isolate that movement relative to the floor surface upon which the support rests. Preferably, the stand also includes a shelf and a plurality of rods that engage the assemblies and connect the shelf to the support. A first assembly engages a first end of each rod with the shelf and a second assembly engages the second end of each rod with the support. The assemblies are configured to permit more movement of the rods in a first horizontal direction than in a second horizontal direction. Thus, the assemblies allow the shelf to move back and forth in the first horizontal direction in response to vibrations in the speaker and air movement adjacent the same. The stand also includes a mechanism for adjusting the inclination of the shelf relative to the support so as to allow sound emitted therefrom to be directed in a particular direction.

21 Claims, 9 Drawing Sheets

STEREO SPEAKER STAND

BACKGROUND OF THE INVENTION

1. Technical Field

This invention generally relates to furniture. More particularly, the invention relates to support stands for stereo equipment. Specifically, the invention relates to a support stand for large stereo speakers that includes a mechanism to enable the stand to move slightly back and forth in response to vibrations in the speaker and air movement adjacent the same and to isolate that movement from the floor surface upon which the stand rests, and polarize that movement to enable the speaker to move more in one direction than in another direction.

2. Background Information

When a sound system is being set up in a room, consideration has to be given to the positioning of various speakers in the system so that sound emitted therefrom is distributed evenly around the room. Further consideration has to be given to the height of each speaker relative to the floor. Sound quality is enhanced if it is essentially focused at the height of the listeners' ears. Consequently, it is desirable to raise speakers off the floor so that they direct sound outwardly at an appropriate height. Large speakers for audio and home entertainment systems frequently cannot be placed on stands or shelves as they are too heavy in that they sometimes weigh as much as 30 lbs. This means that the speakers may not be able to be positioned at an appropriate height to direct sound waves toward the listeners in a room. Even if a speaker can be placed on a stand, high-powered speakers, especially large low frequency bass speakers, move a considerable amount of air back and forth. This low frequency energy may generate considerable vibrations in the speaker and cause it to move forward and rearward across a surface. This migration places the speaker at risk if it is supported a distance above a floor surface. Furthermore, if the speaker cabinet is not rigidly bolted to a heavy mass or to its support, the support itself may vibrate with the speaker and possibly generate additional unwanted noise that ruins the sound quality.

There is therefore a need in the art for a speaker support that will adjust to the vibration and air movement created by the speaker, will substantially reduce migration of the vibrating speaker across the surface of the support, and is adjustable to allow sound emitted therefrom to be directed either upwardly or downwardly into a room.

SUMMARY OF THE INVENTION

The device of the present invention comprises a stand for a stereo speaker. The stand comprises a support and a plurality of isolating and polarizing assemblies that engage the support and allow movement of the speaker relative to the support in one direction more than in another direction and to isolate that movement relative to the floor surface upon which the support rests. Preferably, the stand also includes a shelf and a plurality of rods that engage the assemblies and connect the shelf to the support. A first assembly engages a first end of each rod with the shelf and a second assembly engages the second end of each rod with the support. The assemblies are configured to permit more movement of the rods in a first horizontal direction than in a second horizontal direction. Thus, the assemblies allow the shelf to move back and forth in the first horizontal direction in response to vibrations in the speaker and air movement adjacent the same. The stand also includes a mechanism for adjusting the inclination of the shelf relative to the support so as to allow sound emitted therefrom to be directed in a particular direction.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
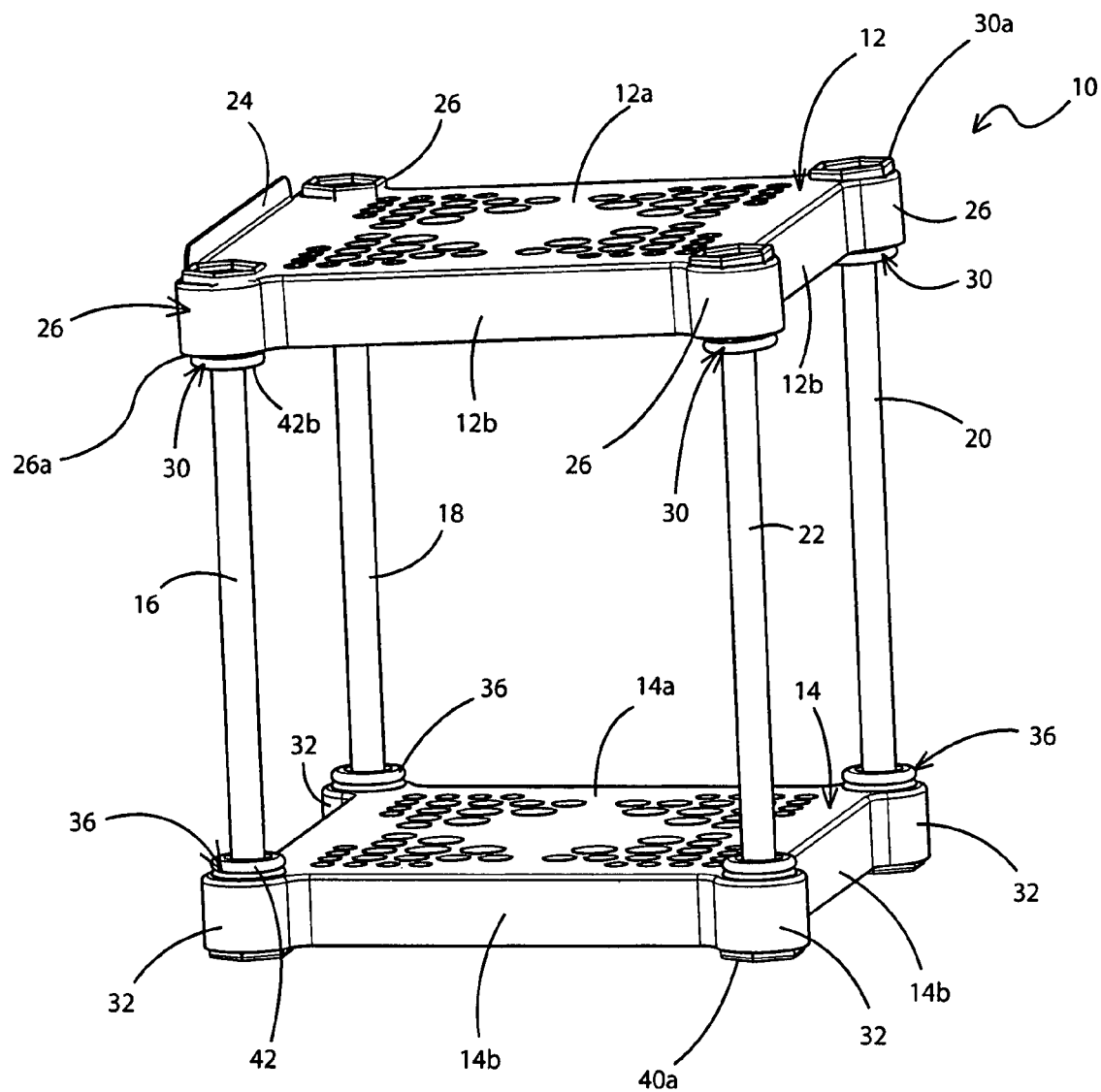
FIG. 1 is a first perspective view of a speaker stand in accordance with the present invention.
Figure 2:
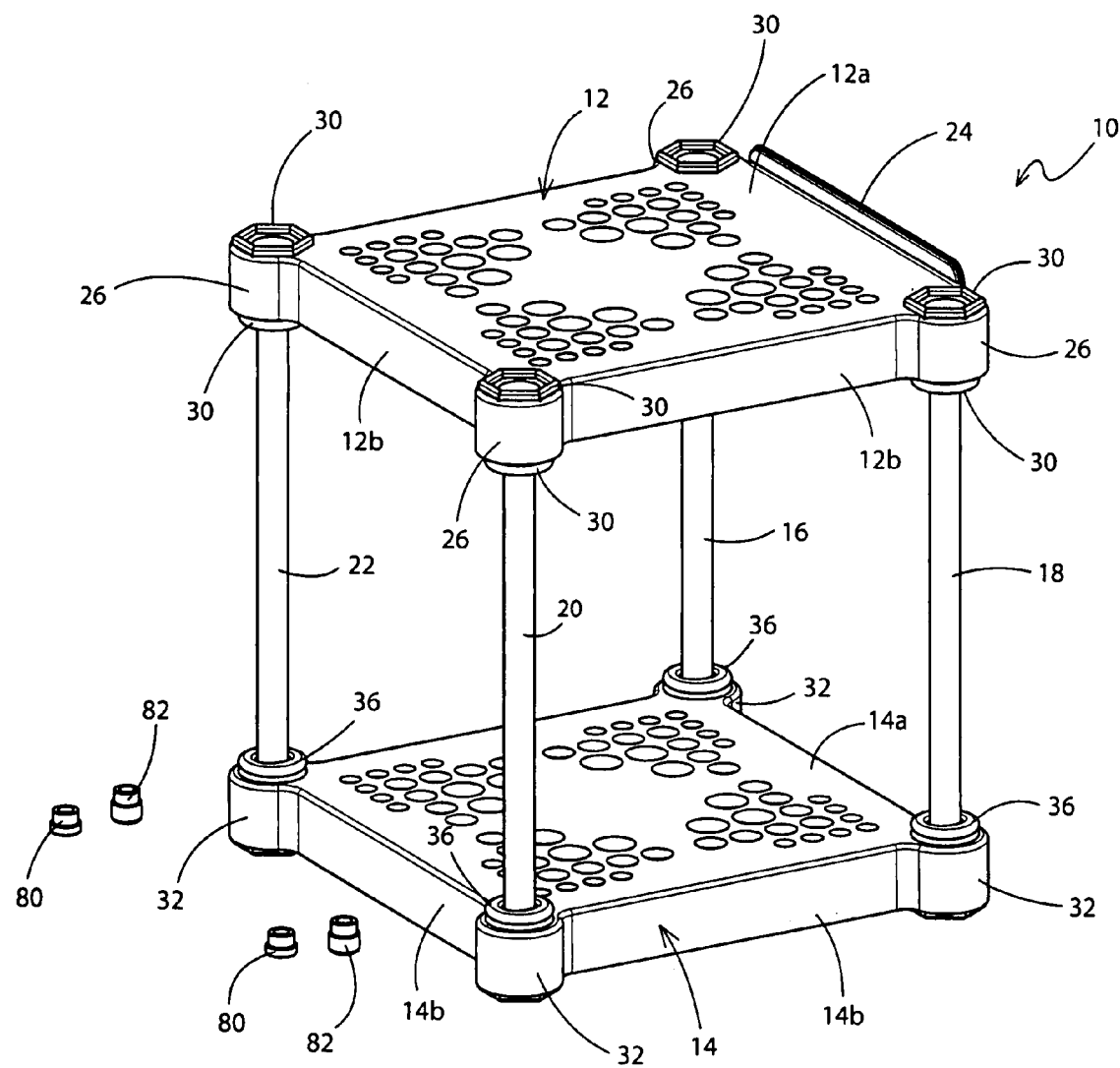
FIG. 2 is a second perspective view of the speaker stand of FIG. 1 with two sets of the adjuster plugs shown separated therefrom.

Referring to FIGS. 1-9, there is shown a speaker stand in accordance with the present invention and generally indicated at 10. Speaker stand 10 comprises a shelf 12 and support 14 positioned vertically relative to each other and maintained a distance apart by a plurality of supporting rods 16, 18, 20 and 22. Shelf 12 and support 14 preferably are made from an injection-molded ABS or styrene plastic, but may alternatively be formed from any other suitable material. Rods 16, 18, 20 and 22 preferably are thin aluminum pipes of equal length, although they may be made from any other suitable metal without departing from the spirit of the invention. Rods 16-22 are provided to support the weight of a speaker 25 (FIG. 9) that is retained on stand 10.

Shelf 12 has a top wall 12a and side walls 12b which extend downwardly away therefrom. One of side walls 12b includes an upwardly extending lip 24 that is provided with an adhesive foam layer (not shown) thereon. Lip 24 is adapted to engage one of the walls of a speaker cabinet 25 (FIG. 9), as will be hereinafter described. Lip 24 substantially prevents the speaker 25 from sliding off top wall 12a of shelf 12. Shelf 12 is molded with four projections 26 proximate the corners thereof. Projections 26 define hexagonally shaped first apertures 28 (FIG. 4) therein. An annular rim 29 extends into each first aperture 28 proximate a bottom end 26a of projection 26.

Figure 5:
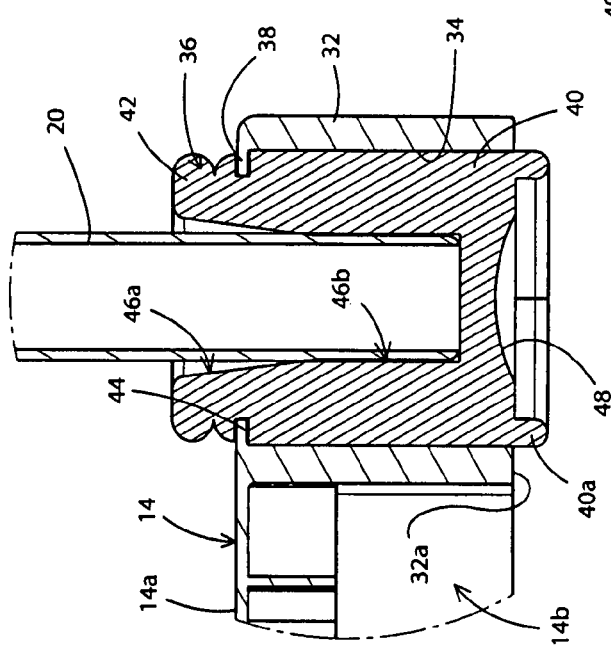
FIG. 5 is an enlargement of highlighted area B of FIG. 4.

Support 14 has a top wall 14a and side walls 14b that extend downwardly away therefrom. Support 14 is molded with four projections 32 proximate its corners. Projections 32 each define hexagonally shaped second apertures 34 (FIG. 4 and 6) therein and each projection 32 is vertically alignable with one of projections 26 on shelf 12. As shown in FIG. 5, each projection 32 includes an annular rim 38 that extends for a distance inwardly into each second aperture 34 proximate a top end of projection 32.

In accordance with a specific feature of the present invention, a plurality of isolating and polarizing assemblies 30, 36 are provided on stand 10. Preferably, a plurality of first assemblies 30 are engaged with shelf 12 and a plurality of second assemblies 36 are engaged with support 14. The assemblies are provided to permit movement of shelf 12 relative to support 14 in response to air movement adjacent speaker 25. The assemblies permit movement of speaker 25 but isolate that movement from floor surface 100. The assemblies further polarize the movement of speaker 25 relative to support 14 so that movement is permitted more in one direction than in another direction.

In accordance with a specific feature of the present invention, the first and second assemblies are resilient bushings 30, 36 that are snap fitted into the respective one of first and second apertures 28, 34 and retain rods 16-22 therebetween. Bushings 36 will be described hereinafter with reference to FIGS. 3-7, but it should be understood that bushings 30 are substantially identical to bushings 36 and are used in the same manner and for the same purpose. Each bushing 36 is an integrally formed, injection molded, rubber component. Bushing 36 has a hexagonally-shaped body 40 and a double annular flange 42 that extend vertically outwardly away from body 40. A shoulder 44 is formed at the transition between body 40 and flange 42. Body 40 is complementary in shape and size to second aperture 34 in projection 32 of support 14. Bushing 36 is snap-fitted into second aperture 34 and can only be received therein when the complementary hexagonal shapes of bushing 36 and second aperture 34 are aligned. A shallow depression 48 is provided in the end of body 40 opposite to flange 42. Depression 48 allows body 40 to flex slightly as bushing 36 is engaged in second aperture 34. When bushing 36 is snap-fitted into second aperture 34, the flange 42 thereof is inserted first into second aperture 34 and bushing is pushed upwardly until shoulder 44 engages rim 38. At this point, flange 42 extends upwardly beyond top wall 14a of support 14 and an end portion 40a of body 40 (FIG. 5) extends outwardly below bottom end 32a of projection 32. End portion 40a is adapted to abut the floor surface 100 upon which stand 10 rests and stand 10 therefore effectively is supported on end portions 40a of bushings 36.

Bushings 30, on the other hand, are inserted into shelf 12 in exactly the opposite orientation. The shoulder (not numbered) of bushing 30 engages rim 29 of projection 26. Flange portion 42b thereof extends downwardly beyond bottom end 26a (FIG. 1) of projection 26 and end portion 30a of bushing 30 extends upwardly away from top wall 12a of shelf 12. Consequently, a larger speaker 25 may not rest directly on shelf 12 but may instead rest on end portions 30a of bushings 30.

Figure 7:
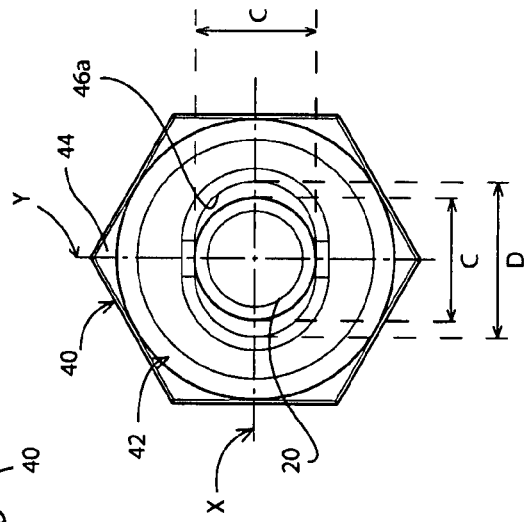
FIG. 7 is a top view of one of the bushings showing a supporting rod retained therein.
Figure 6:
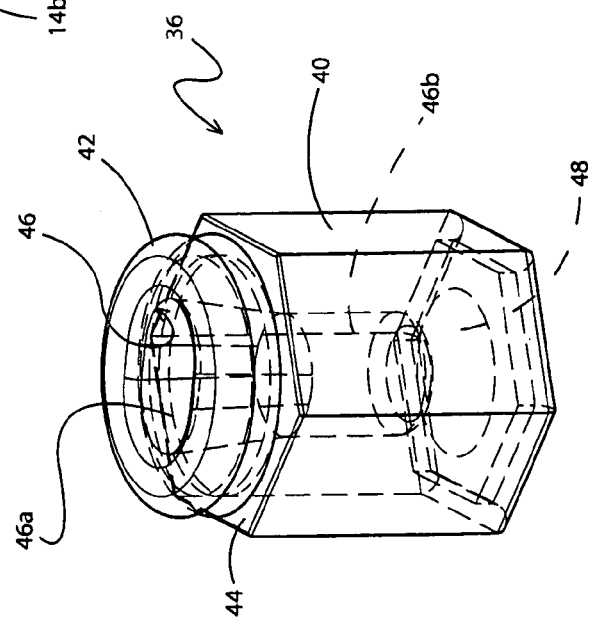
FIG. 6 is a perspective view of a bushing used in the speaker stand of the present invention.

In accordance with another specific feature of the present invention, each bushing 36 is provided with a longitudinal bore 46 that extends from flange 42 into the interior of body 40. Bore 46 does not extend entirely through body 40 and terminates a distance inwardly from depression 48. A first section 46a of bore 46 is substantially oval in cross-sectional shape (FIGS. 6 and 7). A second section 46b of bore 46 extends inwardly from this oval-shaped first section 46a and is generally cylindrical in cross-sectional shape. Bore 46 is provided to receive and retain an end of one of rods 16, 18, 20 and 22 therein. Second section 46b is configured so as to be complementary to the end of one of the rods, such as rod 20. Consequently, the end of rod 20 is tightly retained in second section 46b. First section 46a of bore 46 is not complementary to the external shape of rod 20. As shown in FIG. 7, first section 46a of bore 46 has a width "C" that is substantially equal to the diameter of rod 20. First section 46a has a length "D" that is substantially longer than the diameter "C" of rod 20. Thus, rod 20 is able to move to a limited degree back and forth in a direction parallel to the "Y" axis of bushing 36, but can move considerably more from side to side in a direction parallel to the "X" axis of bushing 36.

The above characteristic features of bushings 30 and 36 provide a mechanism to permit some forward and rearward movement of a portion of stand 10 in response to vibrations in speaker 25 as well as the movement of air adjacent speaker 25, while isolating that movement from floor surface 100. Specifically, bushings 30, 36 enable shelf 12 to move forward and backward relative to support 14 as air moves adjacent speaker 25. This movement is both in response to and in unison with the air movement. Bushings 30, 36, however, polarize this movement so that shelf 12 can move backward and forward but is limited in moving side-to-side. This creates a more stable base for speaker 25. The polarizing ability is enabled because body 40 of bushing 36 is hexagonal in shape and can therefore only engage in second aperture 34 in one of several specific orientations. The actual orientation of bushing 36 can be preselected to permit rods 16-22 and therefore shelf 12, to move more in a first particular direction than in a second direction. The orientation of the length and width of first sections 46a of bushings 36 is specifically selected to allow movement in the first direction and limit movement in the second direction.

Figure 8B:
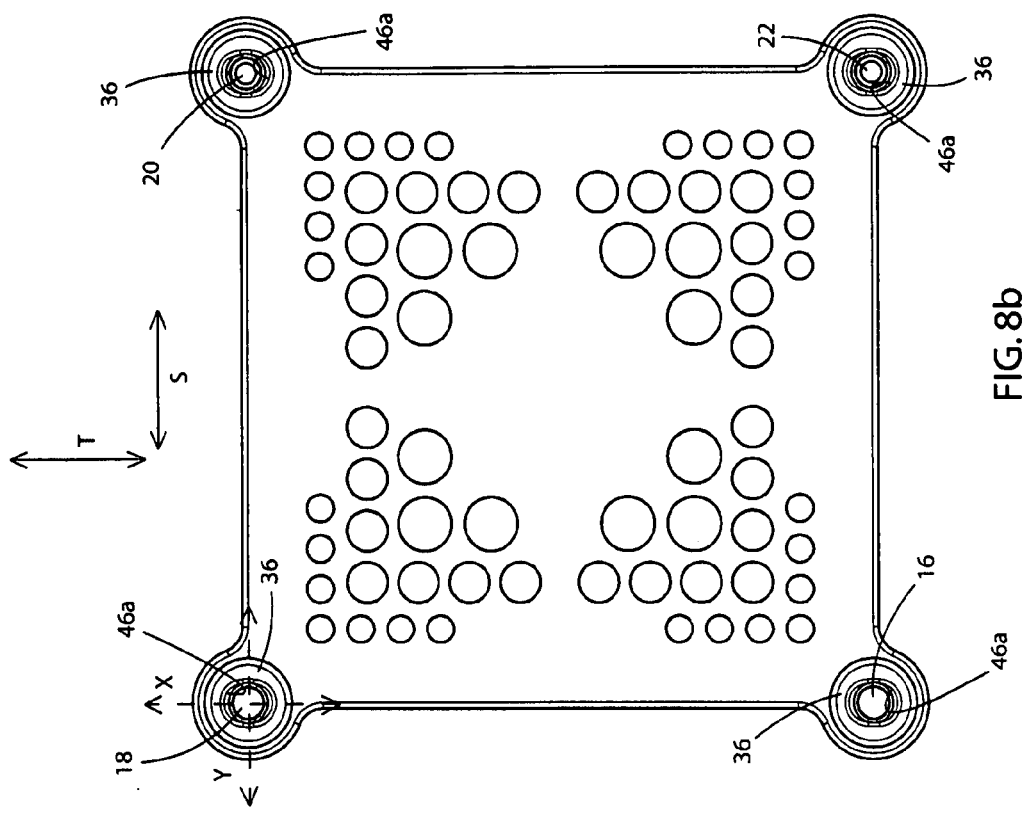
FIG. 8B is a top view of the support taken through line E-E of FIG. 4 and showing a second possible orientation of the bushings therein.
Figure 8A:
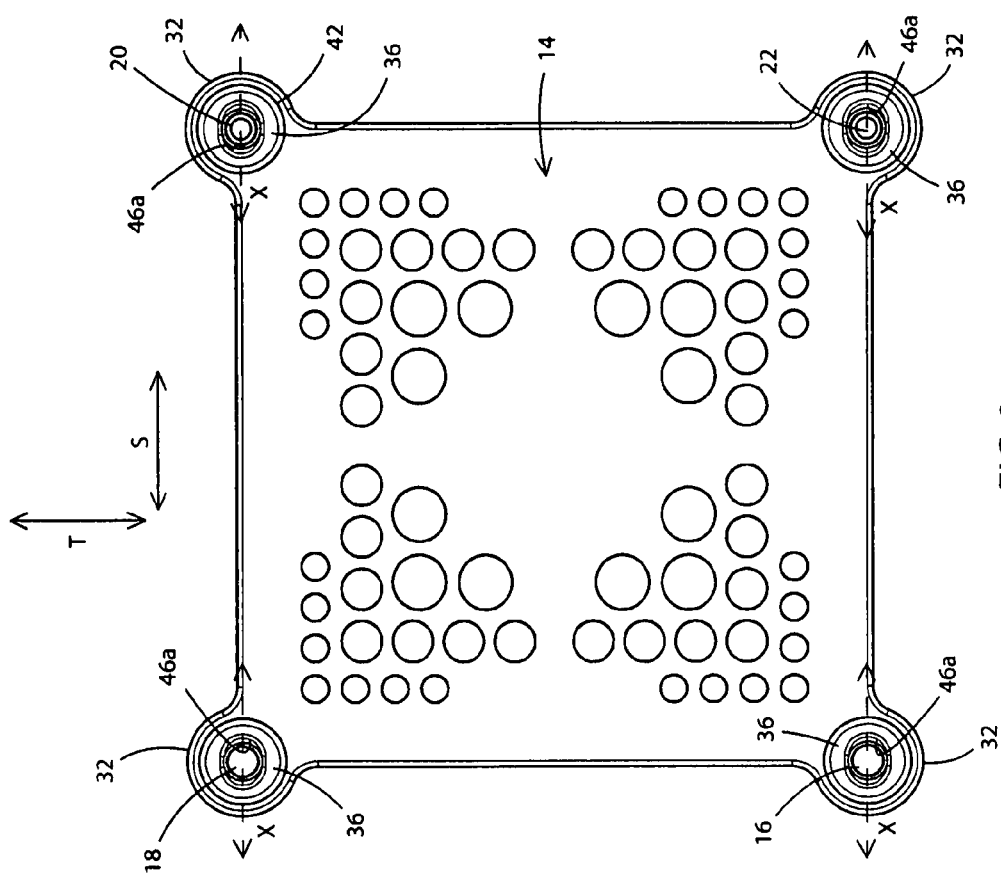
FIG. 8A is a top view of the support taken through line E-E of FIG. 4 and showing a first possible orientation of the bushings therein.
Figure 9:
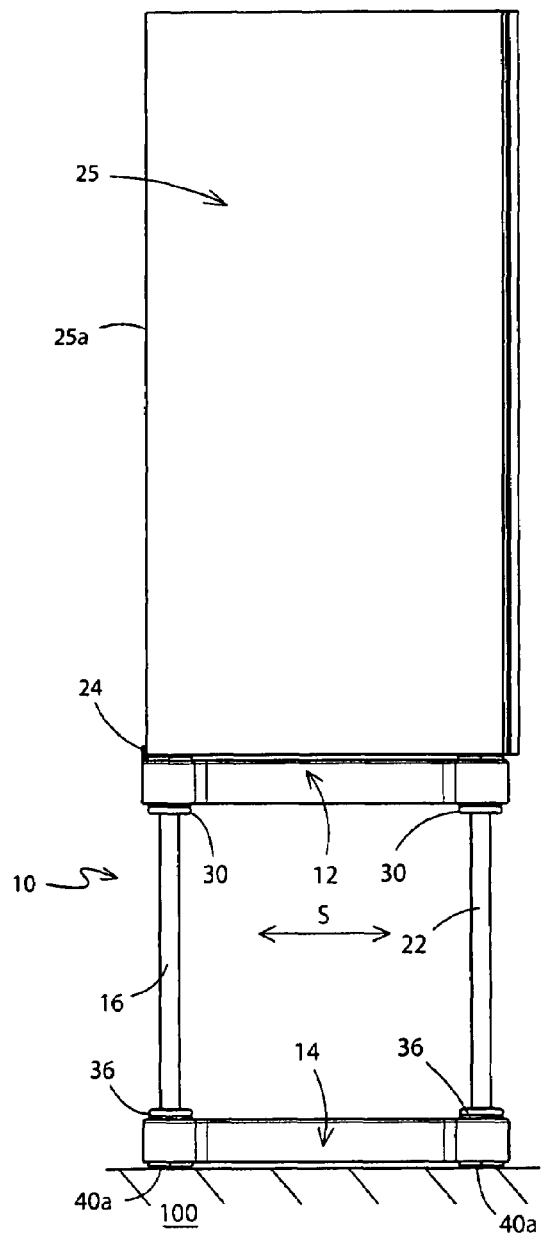
FIG. 9 is a side view of the speaker stand of the present invention showing a speaker cabinet retained thereon; and with the rods of the stand shown in a substantially vertical position.

This is illustrated in FIGS. 8A and 8B. In these figures, air moves adjacent the speaker 25 in the direction indicated by arrow "S". In FIG. 8A, each bushing 36 has been oriented within second aperture 34 so that the length of first sections 46a thereof is aligned with the direction "S" and the width thereof is aligned with the direction "T". The length of each first section 46a is greater than the diameter of the associated rod 16-22 retained therein. The size difference permits some movement of rods 16-22 within bores 46 in a direction substantially parallel to direction "S". Furthermore, the flaring shape of first sections 46a and the tight retention of the ends of rods within second sections 46b of bores 46, causes the back and forth movement of rods 16-22 to also have an arcuate component. This allows shelf 12 to move back and forth in the direction "S" relative to support 14. Support 14 remains in a fixed position on surface 100. Furthermore, the predominant direction of movement of shelf 12 is the same direction as air moving inwardly and outwardly relative to speaker 25. Additionally, the width of first sections 46a of bushings 36 is substantially equal to the diameter of the rods 16-22. Consequently, movement of rods 16-22 in a side-to-side motion in the direction of arrow "T" is considerably reduced. Bushings 36 thereby essentially dampen motion in a direction "T" while allowing motion in the direction "S".

FIG. 8B, illustrates a situation where bushings 36 are oriented so that the lengths of first sections 46a of bores 46 are oriented with their "X" axes aligned with direction "T", and the widths thereof are aligned with direction "S". This orientation of bushings 36 would permit shelf 12 to rock side-to-side relative to support 14, if air movement was aligned with direction "T" and would limit back and forth movement in response to air movement relative to speaker 25. If air movement is aligned with direction "S", stand 10 might be unstable.

Referring to FIGS. 9-14, stand 10 is used in the following manner to support a speaker 25. Speaker 25 is shown supported on stand 10 and preferably resting on end portions 30a of bushings 30. It will be understood that speaker 25 may rest entirely on end portions 30a, or at least partially on end portions 30a and shelf 12, or entirely on shelf 12. Stand 10, itself, is illustrated as supported on surface 100 by resting on end portions 40a of bushings 36. Lip 24 of stand 10 is shown abutting a front wall 25a of speaker 25 so that when speaker 25 moves forward and rearward in response to the air movement adjacent speaker 25, the speaker does not drop forwardly off stand 10 and the vibrations and movement are not transmitted to floor surface 100.

Figure 10:
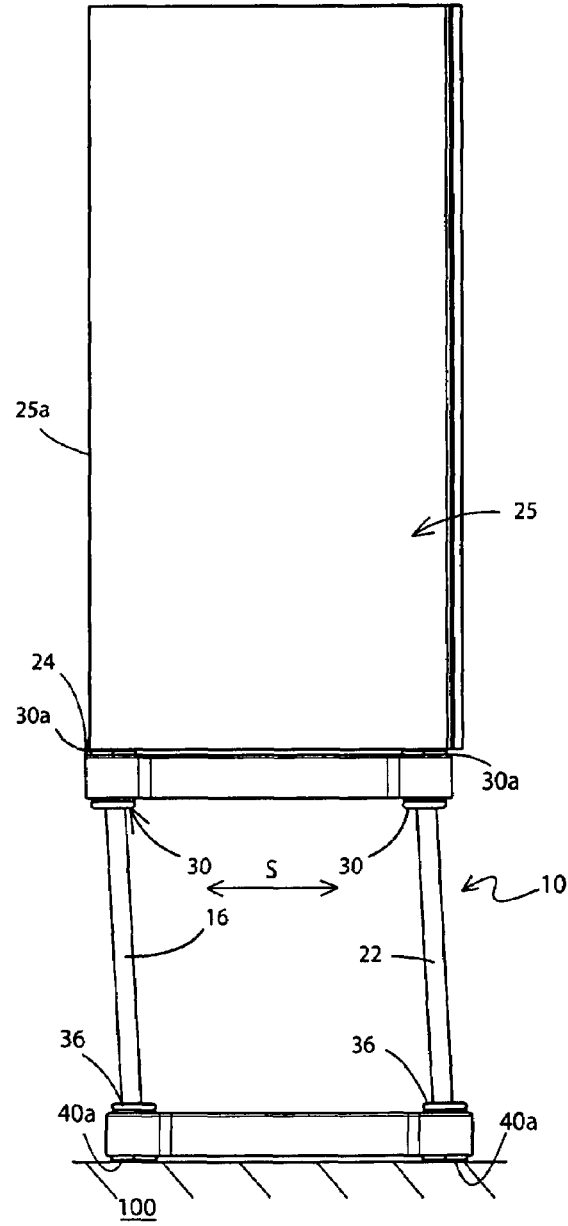
FIG. 10 is a side view of the speaker stand with the speaker cabinet retained thereon, and showing the rods angled away from the vertical and the shelf shifted horizontally relative to the support in response to vibration of the speaker cabinet retained thereon and air movement adjacent to the speaker.
Figure 11:
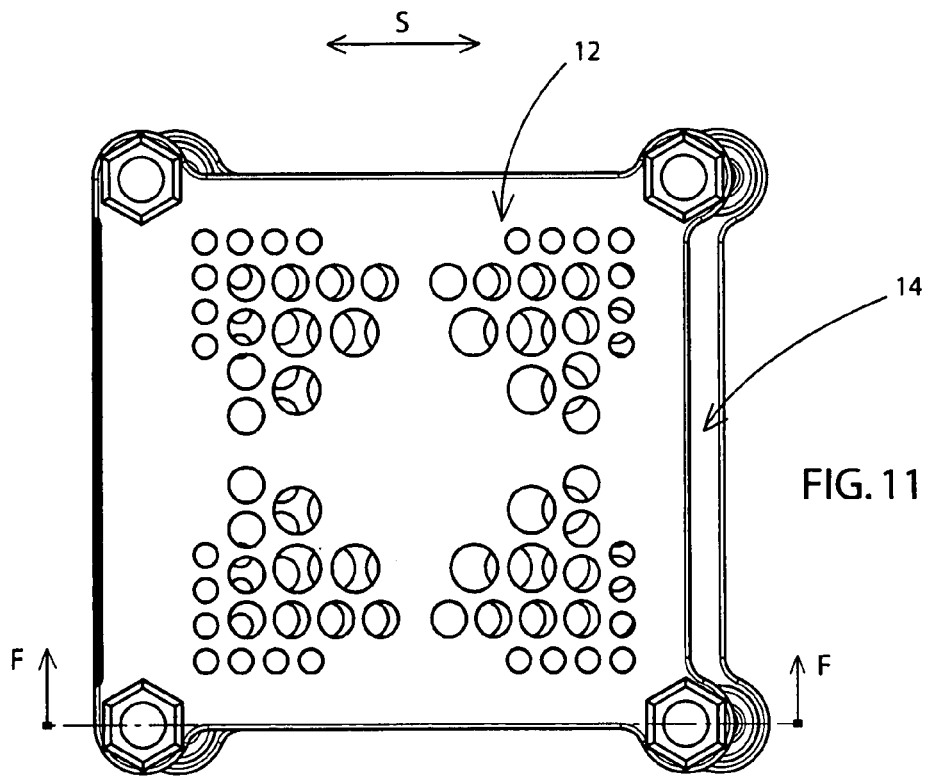
FIG. 11 is a top view of the speaker stand of FIG. 10 with the speaker cabinet removed therefrom to shown the misalignment of the shelf and the support.
Figure 12:
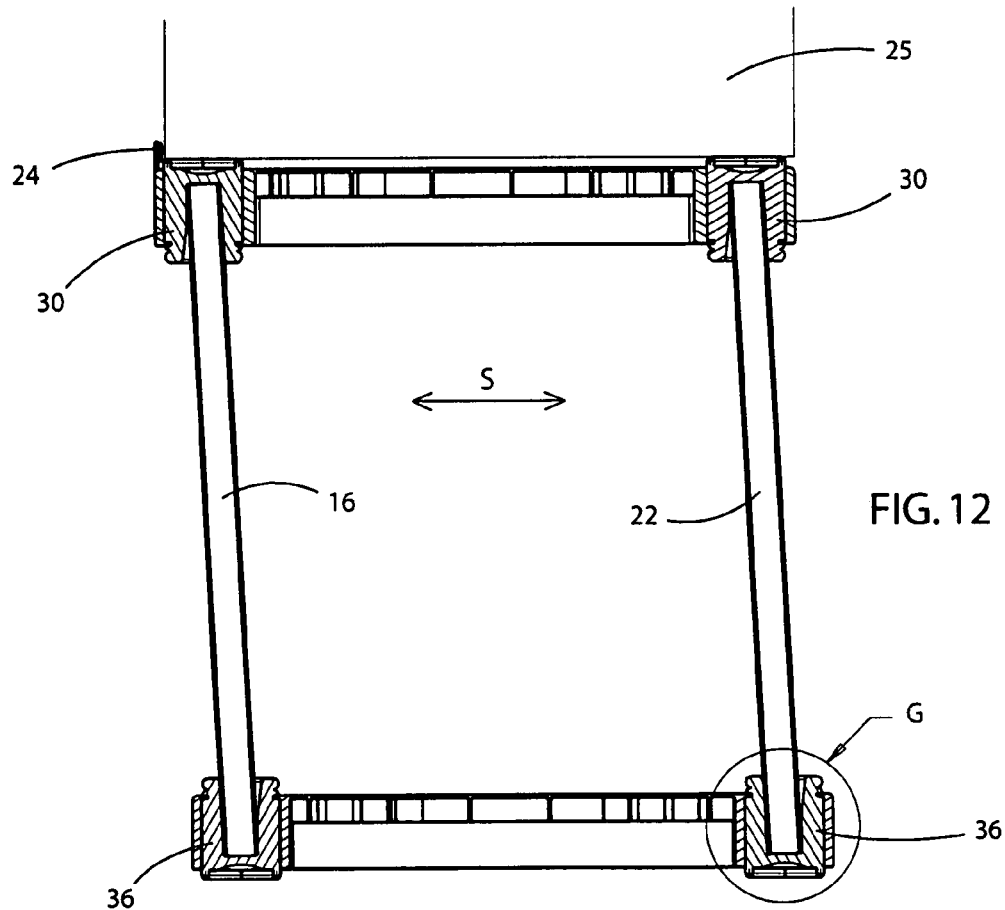
FIG. 12 is a cross-sectional side view of the speaker stand taken through line F-F of FIG. 11.
Figure 13:
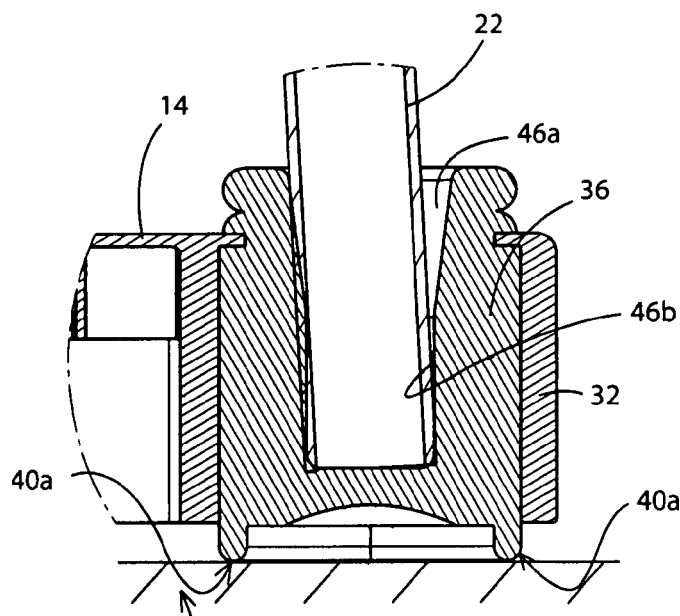
FIG. 13 is an enlargement of highlighted area G of FIG. 12.
Figure 14:
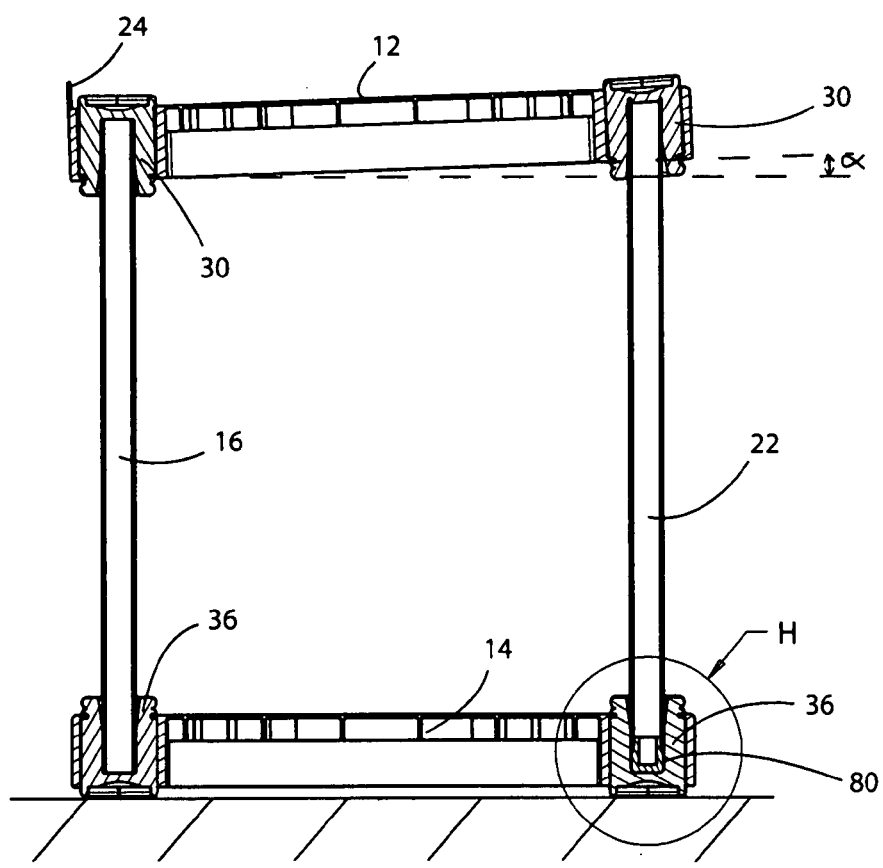
FIG. 14 is a cross-sectional side view of the speaker stand with the adjuster plugs inserted into the one of the sets of bushings so as to incline one side of the shelf upwardly relative to the support.
Figure 15:
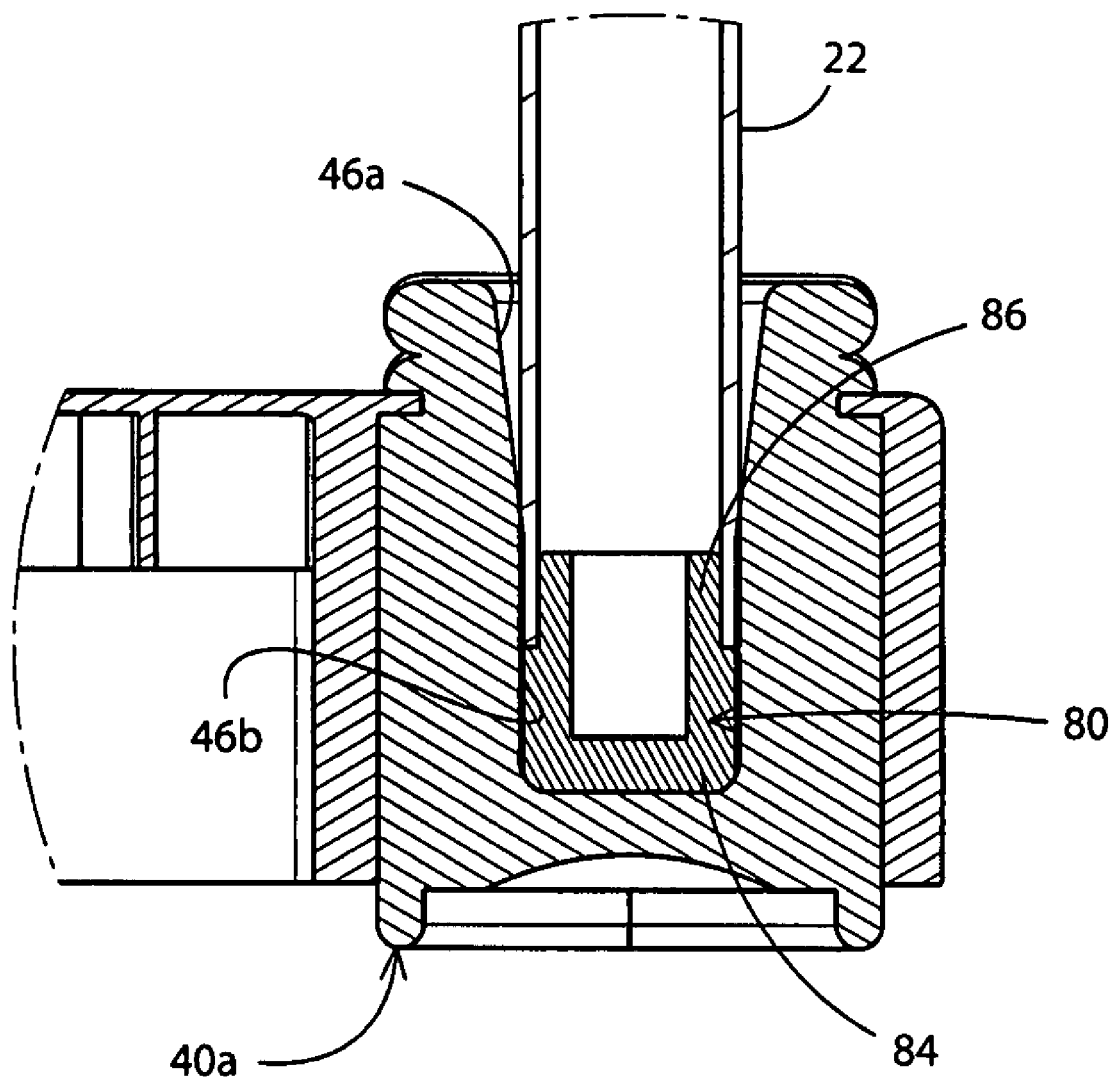
FIG. 15 is an enlargement of highlighted area H of FIG. 14.

FIGS. 9-13 show the position of the relevant components of stand 10 when the speaker is emitting sound through front wall 25a. As speaker 25 vibrates and air is forced outwardly away from front wall 25a in the direction of arrow "S" (FIG. 9), an equal and opposite reactionary force is brought to bear on shelf 12. Because of the orientation of bushings 30, 36 and the difference in dimension between rods 16-22 and first section 46a of bores 46, shelf 12 is able to moves rearwardly in the opposite direction to arrow "S" in response to this reactionary force. Thus, shelf 12 moves from the position shown in FIG. 9 to the position shown in FIGS. 10-12. When the vibratory and air movement is reversed and is in the opposite direction to "S", shelf 12 is caused to move in the direction of arrow "S" and returns to its original position (FIG. 9) or even beyond that position (not shown). The vibrations of speaker 25 and air movement relative thereto, switches again to the direction of arrow "S" causing shelf 12 to move back to the position shown in FIG. 10. Shelf 12 therefore slides back and forth in response to the speaker vibrations and air movement relative to speaker 25. Shelf 12 remains horizontally positioned relative to support 14 during all of this movement and the rods 16-22 angle slightly rearwardly and then slightly forwardly to enable this movement. This occurs because rods 16-22 are able to move slightly within the first sections 46a of bushings 30, 36 (FIGS. 13 and 14). As shown in FIG. 14, when rod 22 moves, end portion 40a of bushing 36 remains firmly in contact with floor surface 100 and rod 20 moves off vertical within bore 46. Shelf 12 and support 14 stay substantially parallel to floor surface 100 even though there is a vertical shift in rods 16-22 (FIG. 10). As discussed above, very little side-to-side motion in the direction of arrow "T" (FIG. 8A) can occur, so shelf 12 and support 14 are horizontally stable, just moving a small distance back and forth to essentially absorb the vibrations from speaker 25. Furthermore, because speaker 25 is resting directly on bushings 30 and does not physically contact shelf 12, no vibrations are transmitted directly to the shelf 12 and therefore no unwanted noise is generated by setting up a vibration in shelf 12. As the speaker 25 vibrates and moves air relative thereto, speaker 25 can effectively float back and forth (arrow "S"—FIG. 8A) on shelf 12 while remaining relatively stable in the side to side direction (arrow "T"—FIG. 8A). If the speaker 25 was allowed to move in both the forward-and-back and side-to-side directions, the speaker 25 would likely be unstable on the stand 10 and would perhaps move in a circle with oscillations. The stand 10 would then not provide adequate security for supporting a heavy speaker 25.

It will be understood that if it is preferably for stand 10 to move slightly from side to side in the direction of arrow "T" (FIG. 8B); then bushings 30, 36 will be oriented in the manner shown in FIG. 8B. Stand 12 will then be caused to sway slightly from side to side because rods 16-22 will move from side to side in the differently oriented bushings 30, 36. Furthermore, stand 10 may be rotated in any needed direction to position lip 24 at an appropriate spot to substantially prevent speaker 25 from being vibrated off the same.

Figure 3:
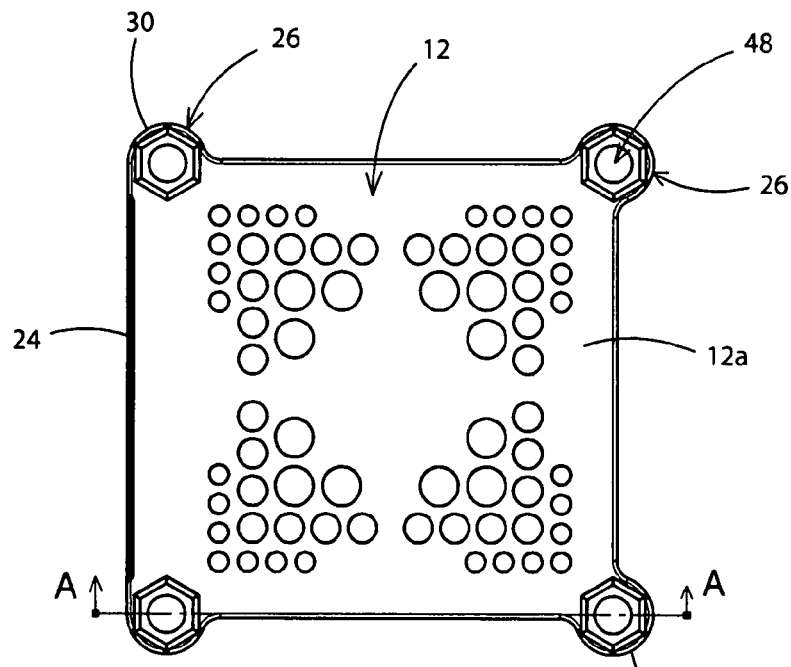
FIG. 3 is a top view of the speaker stand of FIG. 1.
Figure 4:
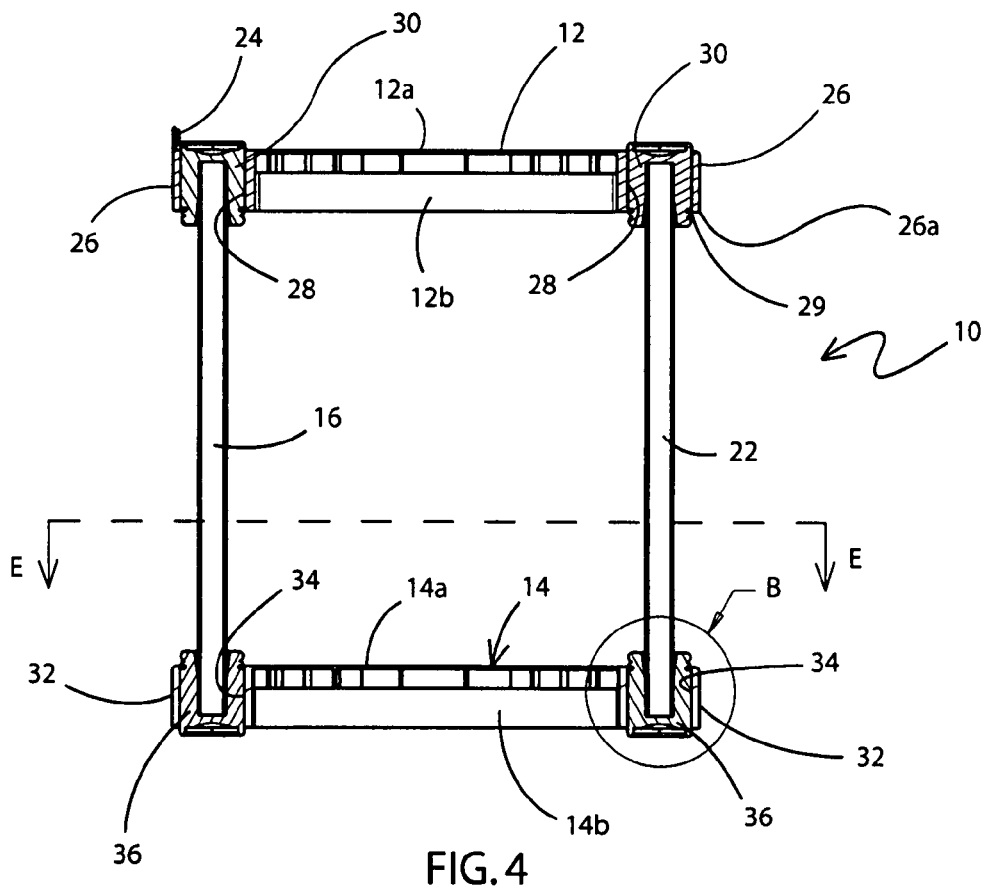
FIG. 4 is a cross-sectional side view of the speaker stand taken through line A-A of FIG. 3.

In some instances, it is desirable to be able to direct sound emitted from the speaker 25 either upwardly or downwardly relative thereto. For instance, if a living room is sunken relative to an area upon which a speaker is to be placed, it might be desirable to angle speaker 25 in such a way that it directs the sound downwardly. This may be done by inclining the shelf 12 relative to the support 14. In order to do this, there are provided one or two sets of adjuster plugs 80, 82 (FIG. 3). Adjuster plugs 80, 82 are made from a suitable plastic material and are of different relative heights. Both size plugs 80, 82 are designed to be received within bore 46 of bushings 36 in the manner shown in FIG. 16. FIG. 16 shows that adjuster plugs 80 (and 82) comprise an annular base 84 that is substantially of the same diameter as second section 46b of bore 46 and the same diameter as rod 22. The upper end 86 of plug 80 is of a narrower diameter than base 84, the difference in the diameter being that of the thickness of the rod 22 to be received around the same. Essentially, a small portion of the end of rod 22 slides over upper end 86 of plug 80 and becomes wedged between upper end 86 and that portion of bushing 36 that defines second section 46b of bore 46. Plug 80 raises one end of shelf 12 away from support 14 by an angle α. Although not shown, plug 82 is longer than plug 80 and, consequently, would raise one end of shelf 12 away from support 14 by an angle greater than α. A speaker resting on shelf 12 will therefore be tilted slightly upwardly (by an angle α) and will therefore direct sound emitted therefrom slightly upwardly.

In a similar fashion, if it is desirable to cause sound to be directed downwardly, plugs 80 or 82 may be inserted in bores 46 of the bushings 36 that receive rods 16 and 18 instead of rods 20 and 22. This will cause the opposite end of shelf 12 to be lifted and, consequently, a speaker resting on shelf 12 will be adjusted to cause the sound emitted therefrom to be directed downwardly toward floor surface 100. Whether shelf 12 is tilted upwardly at the front or downwardly at the back, support 14 remains firmly seated on the floor surface 100 and remains horizontally disposed relative thereto. In both these instances, lip 24 plays an important roll keeping speaker 25 on shelf 12. Furthermore, because of the presence of the oval shaped first section 46a of bores 46 in bushings 30, 36, vibrations can be polarized and dampened in stand 10 even when plugs 80 or 82 are utilized therein.

It will be understood that it is possible that one of each of the adjuster plugs 80, 82 could be received within a single bore 46 of bushings 30, 36 if the tilt angle required a more extensive height adjustment.

Whenever stand 10 retains speaker 25 therein, the bushings 30, 36, and especially the flanges 42 and curved end portions 30a and 40a aid in dampening the vertical vibrations emitted from speaker 25 because they flex.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A stand, for supporting a stereo speaker, said stand comprising:
   a support;
   a plurality of elongated rods, each rod having a first end and a second end and having a cross-sectional shape that is of a first length and a first width;
   a plurality of isolating assemblies, each assembly engaging the support and being adapted to allow movement of the speaker relative to the support while isolating that movement from a surface upon which the support rests; and wherein each assembly comprises:
      a resilient bushing having a first surface and a second surface with a longitudinal axis extending therebetween and a horizontal axis disposed at right angles thereto;
      a bore defined in said bushing, said bore originating in said first surface and terminating a distance inwardly from said second surface; and wherein said bore has a cross-sectional shape at the first surface configured to receive the first end of one of the rods therethrough; and wherein said cross-sectional shape of the bore is of a second length and a second width; and the second length is greater than the second width; and wherein the second length is also greater than the first width of the rod, and the second width is substantially equal to the first width of the rod; and wherein the assemblies are additionally polarizing assemblies that are configured to allow movement of the speaker relative to the support in one direction disposed substantially parallel to the horizontal axis more than in another direction disposed substantially parallel to the horizontal axis.

2. The stand as defined in claim 1, further comprising:
   a shelf; and wherein said rods extend between said support and said shelf, and said shelf is positioned one of vertically above and vertically beneath said support by said rods and said second ends of the rods engage the shelf.

3. The stand as defined in claim 1, wherein the support has an upper surface and a lower surface and defines a plurality of apertures therein that extend between said upper and lower surfaces; and each of the-assemblies is received in one of the apertures such that the first surface of the assembly is disposed proximate one of the upper and lower surfaces and the second surface of the assembly is disposed proximate the other of the upper and lower surfaces.

4. The stand as defined in claim 3, wherein each bushing comprises:
   a body portion which includes the second surface; and
   a flange portion which includes the first surface; and wherein the body portion is engaged in the one of the apertures.

5. The stand as defined in claim 4, wherein the body portion has a cross-sectional shape complementary to a cross-sectional shape of the one of the apertures, and the cross-sectional shape of the aperture is such that the body is only insertable therein in a specific orientation.

6. The stand as defined in claim 5, wherein each of the apertures is hexagonal in cross-sectional shape; and wherein the body portion of each bushing is of a complementary hexagonal cross-sectional shape.

7. The stand as defined in claim 6, wherein the flange portion of each bushing is circular in cross-sectional shape.

8. The stand as defined in claim 4, wherein the flange portion of the bushing extends outwardly from the one of the apertures.

9. The stand as defined in claim 8, wherein the flange portion of each assembly extends outwardly beyond an upper surface of the support and is adapted to engage the stereo speaker.

10. The stand as defined in claim 1, further comprising a plurality of second assemblies engageable with the support; and wherein the second end of each rod is engaged with one of the second assemblies and wherein each of the second assemblies is adapted to polarize and isolate the movement of the speaker relative to the support and to the surface upon which the support rests.

11. The stand as defined in claim 10, wherein the support includes a plurality of second apertures therein; and said second assemblies are each engaged in one of the second apertures.

12. The stand as defined in claim 11, and wherein a portion of each second assembly extends outwardly beyond a lower surface of the support.

13. The stand as defined in claim 12, wherein the second assembly comprises:
   a body portion that is received within the second aperture; and
   a flange portion that extends outwardly beyond the lower surface of the support and is adapted to contact a floor surface upon which the stand sits.

14. The stand as defined in claim 1 further comprising a plurality of adjuster plugs; each adjuster plug having a length and being engageable with one of the assemblies to vertically elevate a portion of the support relative to another portion of the support.

15. A stand for supporting a stereo speaker, said stand comprising:
   a support;
   a plurality of first apertures defined in the support;
   a plurality of rods, each rod having a first end and a second end;
   a plurality of first isolating assemblies engaged with the support and being adapted to allow movement of the speaker relative to the support while isolating that movement from a surface upon which the support rests; wherein each assembly comprises a polarizing assembly configured to allow movement of the speaker relative to the support in one direction more than in another direction; and wherein each of said first assemblies comprises a resilient bushing having:
      a body portion that is engaged in one of the first apertures in the support;
      a flange portion that extends outwardly from the one of the first apertures;
      a bore comprising:
         an innermost first section being substantially circular in cross-sectional shape and complementary in shape and size to the first end of the rods;
         an outermost second section being substantially oval in cross-sectional shape and being non-complementary in shape and size to the first ends of the rods; and wherein the first end of one of the rods is received within the bore of each bushing such that a portion of the first end of the rod is tightly retained within the first section of the bore and another portion of the first end of the rod is loosely retained within the second section of the bore and is movable therein.

16. The stand as defined in claim 15, wherein the second section of the bore has a width and a length; and the width of the bore is substantially equal to an external diameter of the rods; and the length of the bore is greater than the external diameter of the rods.

17. The stand as defined in claim 16, wherein the first assemblies permit greater movement of the rods in a first horizontal direction than in a second horizontal direction.

18. The stand as defined in claim 17, wherein movement of the rods in the first horizontal direction is disposed substantially at right angles to movement of the rods in the second horizontal direction.

19. The stand as defined in claim 18, wherein the first assemblies are orientable within the first apertures in the support to permit movement of the rods in the first horizontal direction; whereby the first assemblies are adapted to be substantially aligned with a direction in which vibrations from a speaker and air movement relative thereto when the speaker is supported on the stand and emitting sound therefrom.

20. The stand as defined in claim 19, wherein the first assemblies are orientable so that the length of the second section of the bore is adapted to be substantially aligned with the direction in which air will move relative to the speaker; and the width of the second section of the bore is at right angles thereto.

21. The stand as defined in claim 15, further comprising a plurality of adjuster plugs; each adjuster plug having a length and being receivable within the bore of the resilient bushing to vertically elevate a portion of the support relative to another portion of the support.

* * * * *